United States Patent
Sreeharsha et al.

(10) Patent No.: US 11,807,553 B1
(45) Date of Patent: Nov. 7, 2023

(54) DECONTAMINATION OF WATER USING GUAR GUM DERIVATIVES AND APPLICATIONS THEREOF

(71) Applicant: KING FAISAL UNIVERSITY, Al-Ahsa (SA)

(72) Inventors: Nagaraja Sreeharsha, Al-Ahsa (SA); Anroop B. Nair, Al-Ahsa (SA); Mahesh Attimarad, Al-Ahsa (SA); Katharigatta N. Venugopala, Al-Ahsa (SA); Bandar Aldhubiab, Al-Ahsa (SA); Sonia Kundu, Al-Ahsa (SA); Aalok Basu, Al-Ahsa (SA); Suvadra Das, Al-Ahsa (SA); Partha Roy, Al-Ahsa (SA); Teeka Sathiesh Roopashree, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/138,262

(22) Filed: Apr. 24, 2023

(51) Int. Cl.
  *C02F 1/28* (2023.01)
  *C02F 101/34* (2006.01)
  *C02F 101/38* (2006.01)

(52) U.S. Cl.
  CPC ........ *C02F 1/286* (2013.01); *C02F 2101/345* (2013.01); *C02F 2101/38* (2013.01); *C02F 2101/40* (2013.01); *C02F 2305/08* (2013.01)

(58) Field of Classification Search
  None
  See application file for complete search history.

(56) References Cited

U.S. PATENT DOCUMENTS

| | | |
|---|---|---|
| 2009/0250404 A1 | 10/2009 | Berkowitz et al. |
| 2014/0256545 A1* | 9/2014 | Velev ..................... A01N 59/16 424/490 |
| 2016/0244342 A1 | 8/2016 | Bezbaruah et al. |
| 2017/0096357 A1* | 4/2017 | Bera ........................ C02F 9/00 |
| 2019/0327963 A1* | 10/2019 | Li .......................... A01N 35/02 |
| 2020/0054983 A1* | 2/2020 | Jonnavittula ........ B01J 20/3425 |
| 2020/0360895 A1 | 11/2020 | Tufenkji et al. |
| 2021/0261997 A1* | 8/2021 | Cuero Rengifo ....... C12P 19/14 |
| 2022/0054983 A1 | 2/2022 | Tehrani |

OTHER PUBLICATIONS

Fairhurst, D., https://www.americanpharmaceuticalreview.com/Featured-Articles/133232-An-Overview-of-the-Zeta-Potential-Part-1-The-Concept/ (2013) (Year: 2013).*

(Continued)

*Primary Examiner* — Chester T Barry
(74) *Attorney, Agent, or Firm* — Nath, Goldberg & Meyer; Richard C. Litman

(57) ABSTRACT

Decontamination of water using guar gum (GG) derivatives and applications thereof are provided herein. For water decontamination, guar gum cinnamate (GGCi) is fabricated into nanoparticles having a high surface area that facilitates the removal of water pollutants by adsorption. Owing to its high availability, low cost, slow biodegradability and high sustainability, GG is considered promising as a next generation cost effective green material for water decontamination.

10 Claims, 5 Drawing Sheets

(56) References Cited

OTHER PUBLICATIONS

Mandal et al., Guar gum, a low-cost sustainable biopolymer, for wastewater treatment: A review, International Journal of Biological Macromolecules 226 (2023) 368-382 (available online Dec. 10, 2022). (Year: 2023).*

Russo, et al., "Sustainable Removal of Contaminants by Biopolymers: A Novel Approach for Wastewater Treatment. Current State and Future Perspectives", Processes 2021, 9(4), 719; https://doi.org/10.3390/pr9040719; Published: Apr. 19, 2021, Special Issue Advances of Nanocomposites in Bioremediation Processes.

Mandal, et al., "Guar gum, a low-cost sustainable biopolymer, for wastewater treatment: A review", Macromolecules, vol. 226, Jan. 31, 2023, pp. 368-382.

Das, et al., "Guar gum cinnamate ouzo nanoparticles for bacterial contact killing in water environment", Carbohydrate Research, vol. 491, May 2020, 107983, Available online Mar. 15, 2020, Version of Record Mar. 28, 2020.

\* cited by examiner

DECONTAMINATION OF WATER USING GUAR GUM DERIVATIVES AND APPLICATIONS THEREOF

BACKGROUND

1. Field

The disclosure of the present patent application relates generally to decontamination of water using guar gum derivatives and applications thereof. For water decontamination, guar gum cinnamate (GGCi) is fabricated into nanoparticles where the high surface area facilitates the removal of water pollutants by adsorption.

2. Description of the Related Art

Biopolymers are macromolecules derived from living species and are typically sustainable, carbon neutral, renewable and compostable. In addition, biopolymers have the potential to cut carbon emissions and reduce $CO_2$ footprint. However, performance limitations, ease in environmental disintegration, and often higher cost have hindered biopolymer material access to niche market needs. One strategy is biopolymer modifications for application enhancements. Engineered biopolymers are also one of the frontrunner areas of research for eco-friendly materials in a wide spectrum of applications including water decontamination.

For example, guar gum (GG) is a galactomannan (a natural biopolymer) obtained from the seeds of *Cyamopsis tetragonalobus* and composed of chains of β-D-mannose units juxtaposed with an α-D-galactose moiety. GG is cultivated mostly in the arid regions like Gujarat, Haryana and Rajasthan in India. Owing to its high availability, low cost, slow biodegradability and high sustainability, GG is considered a promising target for next generation cost effective green materials.

GG molecules can entrap a large amount of water and coherent structural changes are apparent in GG interactions with water. Water pollution resulting from contaminants like dyes, phosphorus, sulfamethazine, and heavy metals impose a great threat and is a worldwide matter of concern. The contaminants abound in the wastewaters released from modern chemical industries such as textile, dyestuffs, metal plating, paper, mining, fertilizer, metallurgical, pesticides, tannery, mining, and various plastics like polyvinyl chloride and have increased extensively by the recent rapid industrialization. Since they are not easily biodegradable and some are completely non-biodegradable, these contaminants tend to accumulate in living organisms unlike organic type contaminants that are easily biodegradable. Water remediation thus remains a major challenge, and the use of biopolymeric adsorbent for decontamination of water is of interest. This arises from the alarming increase in water scarcity in many parts of the world due to increases in population, which exerts immense pressure on available water resources.

Thus, there exists a need for new multiple use, sustainable, renewable biopolymers like guar gum (GG) materials for decontamination of water.

SUMMARY

The disclosure of the present application relates to decontamination of water using guar gum (GG) derivatives and applications thereof. For water decontamination, guar gum cinnamate (GGCi) was fabricated into nanoparticles having a high surface area that facilitates the removal of water pollutants by adsorption. The nanoparticles can be synthesized by a cost-effective simple nanoprecipitation technique.

Biodegradable, non-toxic, non-carcinogenic, green plant products can be effectively utilized for multifaceted applications, one of them being decontamination of water. Various derivatives synthesized from galactomannan guar gum (GG) are green. Accordingly, in one aspect, the present subject matter relates to homogeneous phase synthesis of nanoparticles of guar gum derivatives in the presence of the Hofmeister cation, Li, to synthesize derivatives from galactomannan, which triggered the development of high degree of substitution (DS) derivatives. Earlier reports on ion catalyzed GG galactomannan derivatization reactions have resulted in low DS products. One reason was restrictive diffusion of reactive reagents in the extensive hydrogen bonded GG biopolymer network. However, the present reactions using the Hofmeister cation Li were also exothermic, so no extra heat is required, which aids in energy conservation and cost effectiveness.

For water decontamination purposes, a high DS GG derivative such as a guar gum cinnamate (GGCi) can be fabricated into nanoparticles. The nanoparticles can be synthesized by a cost-effective, simple nanoprecipitation technique. These nanoparticles can be employed in water decontamination purposes because of their high surface area which in turn facilitates the removal of pollutants by an adsorption mechanism. The removal of organic dyes and other pollutants can be carried out by a simple adsorption process. Furthermore, the hydrophobic nanoparticles can aid in microbial decontamination. Thus, the decontaminant is of multifunctional value.

Accordingly, in one embodiment, the present subject matter relates to a method for decontaminating water, the method comprising: providing nanoparticles of a high degree of substitution (DS) guar gum cinnamate (GGCi); contacting the nanoparticles of a high degree of substitution guar gum cinnamate with contaminated water; and adsorbing pollutants from the contaminated water onto a surface of the nanoparticles of a high degree of substitution guar gum cinnamate, thereby decontaminating the water.

In another embodiment, the present subject matter relates to a process of manufacturing high degree of substitution (DS) guar gum derivatives comprising guar gum cinnamate (GGCi) by a highly exothermic reaction using the Hofmeister cation Li.

In a further embodiment, the present subject matter relates to a method of fabricating the high DS guar gum derivative comprising guar gum cinnamate (GGCi) into nanoparticles.

In an embodiment, the present subject matter further relates to a method of using high DS guar gum cinnamate (GGCi) nanoparticles for water decontamination by removing organic dyes and pollutants from water along with microbial load elimination.

These and other features of the present subject matter will become readily apparent upon further review of the following specification.

DETAILED DESCRIPTION OF THE PREFERRED EMBODIMENTS

Figure 1A:
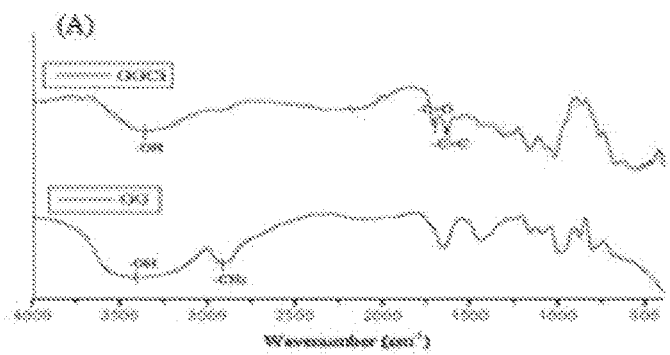
FIG. 1 shows (A) an FTIR of Guar Gum (GG) and Guar Gum Cinnamate (GGCi), (B) a $^{13}$C-NMR of GG; and (C) a $^{13}$C-NMR of GGCi.

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In one embodiment, the present subject matter relates to a process of manufacturing high degree of substitution (DS) guar gum (GG) derivatives comprising guar gum cinnamate (GGCi) by a highly exothermic reaction using the Hofmeister cation Li. The process includes the steps of washing raw guar gum (GG) with an organic solvent-water blend before conducting a derivatization reaction. Guar gum cinnamate (GGCi) can be synthesized in Hofmeister ion guided homogeneous phase reactions involving decanting, LiCl, DMSO, nitrogen purging, a reflux condenser, heating, cinnamoyl chloride, cooling, filtering and obtaining the GGCi precipitate product. Different molar ratios of cinnamoyl chloride to polymer can be used to obtain high degree of substitution (DS) products. The GGCi product can then be characterized by routine analysis.

In another embodiment, the present subject matter relates to a method of fabricating the high DS guar gum cinnamate (GGCi) into nanoparticles. GGCi nanoparticles can be prepared by a facile nanoprecipitation technique. GGCi dissolved in DMSO in a dialysis bag can be placed in deionized water under constant magnetic stirring. After a period of time, the contents in the dialysis bag are lyophilized to powders for analysis by routine methods.

The thus obtained nanoparticles can have a particle size of about 200 nm to about 300 nm. Table 1 below shows certain physical characteristics for the expected GGCi nanoparticles:

TABLE 1

| Compound | Particle size (nm) | PDI | Zeta-potential (mV) |
| --- | --- | --- | --- |
| GGCi nanoparticles | 289 | 0.43 | −19 ± 2.5 |

Figure 2:
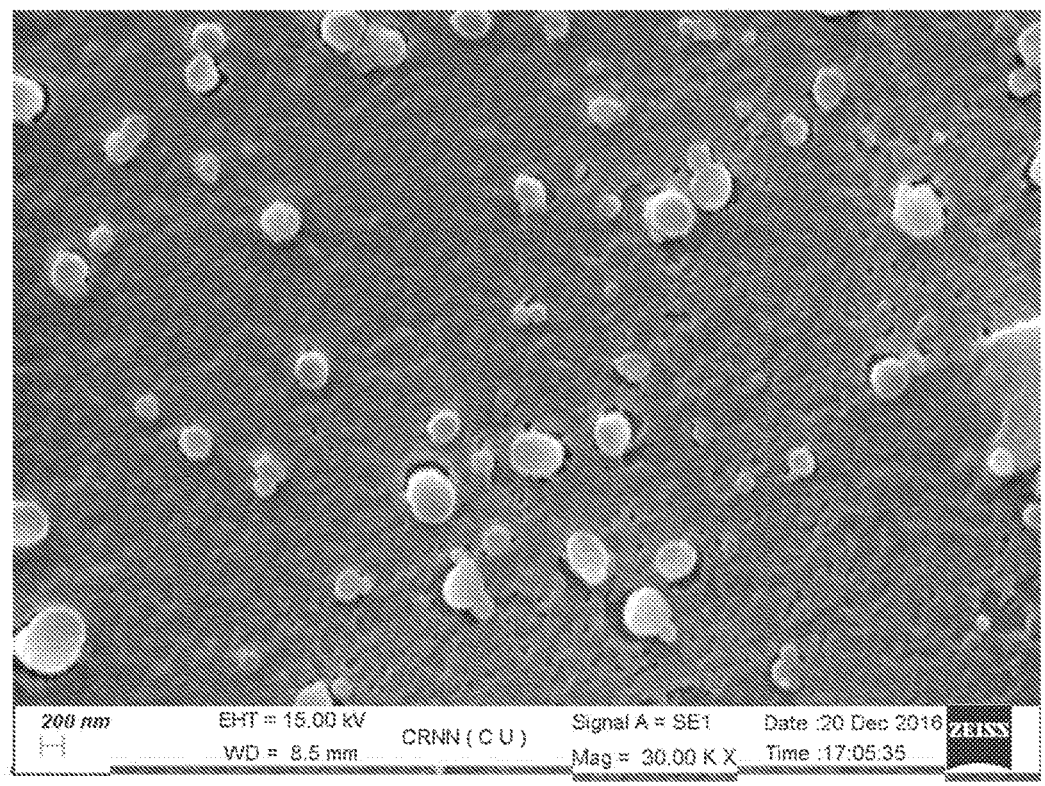
FIG. 2 shows a scanning electron microscope (SEM) image of guar gum cinnamate nanoparticles.

As seen in Table 1, a sample of GGCi nanoparticles produced according to the present methods has a particle size of about 289 nm with a Polydispersity Index (PDI) of about 0.43. The PDI value indicates the GGCi nanoparticles can produce stable colloidal dispersions in aqueous solutions. Further the zeta potential ($\zeta$) of the particles was observed at −19±2.5 mV, or from about 16.6 mV to about 21.5 mV. This suggests the formation of very stable nanoparticle suspension by electrostatic stabilization are possible. Further, as seen in FIG. 2, the thus produced GGCi nanoparticles can be nearly spherical and compact with an average size of 200 nm when observed in a scanning electron microscope (SEM).

In further embodiments of the present subject matter, the guar gum cinnamate (GGCi) nanoparticles are hydrophobic and the process for preparing guar gum cinnamate (GGCi) nanoparticles comprises a simple energy efficient process termed as the 'ouzo effect'. Solvent diffusion, phase change, and self-assembly formations can result in the formation of nearly spherical nanoparticles. Biopolymers possessing surface hydrophobic groups can otherwise form similar nanoparticles. The resultant nanoparticles are hydrophobic. The initial concentration of GGCi is a governing factor in determining the size of the nanoparticles formed. Diffusion of DMSO in water can result in Marangoni mass transfer effects' which lead to biopolymer chain associations and self-assembly nanoparticle generation.

Figure 1B:
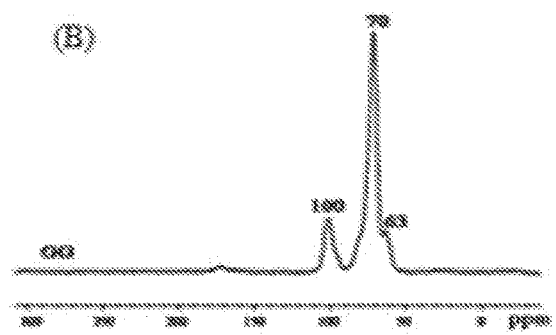
Figure 1C:
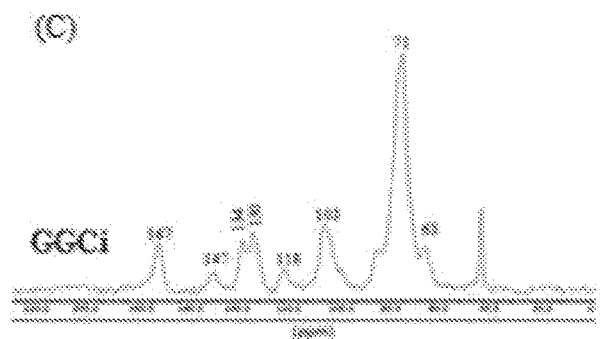

The results of NMR and FTIR analyses of thus produced GG and GGCi can be found in Table 2 and FIGS. 1(A)-1(C).

TABLE 2

| Compound | Spectroscopy | Salient Peaks | Description |
|---|---|---|---|
| Guar gum (GG) | FTIR | 3430 cm$^{-1}$ | —OH stretching |
| | | 2922 cm$^{-1}$ | —CH$_2$ stretching |
| | | 1079 cm$^{-1}$ | Glycosidic linkage —C$_6$—O—C$_1$ |
| | | 1072 cm$^{-1}$ | Sugar ether |
| | $^{13}$C-NMR | 70 ppm | Pyranose carbon atoms |
| | | 63 ppm | C$_6$ carbon atom |
| | | 100 ppm | C$_1$ carbon in the polysaccharide backbone |
| Guar gum cinnamate (GGCi) | FTIR | 3415 cm$^{-1}$ | —OH stertching |
| | | 1709 cm$^{-1}$ | —C═O stretching |
| | | 1636 cm$^{-1}$ | —C═C stretching |
| | $^{13}$C-NMR | 71 ppm | Pyranose carbon atoms |
| | | 103 ppm | C$_1$ carbon in the polysaccharide backbone |
| | | 167 ppm | —C═O carbon atom |
| | | 147, 118 ppm | —C═C unsaturated carbon atoms |
| | | 134, 130 ppm | Aromatic carbon atoms of the cinnamate moeity |

In an embodiment, the present subject matter relates to a method for decontaminating water comprising using high DS guar gum cinnamate (GGCi) nanoparticles to remove organic dyes and pollutants via adsorption from water along with microbial load elimination, wherein the hydrophobic nanoparticles aid in microbial decontamination.

In this regard, in one embodiment, the present subject matter relates to a method for decontaminating water, the method comprising: providing nanoparticles of a high degree of substitution (DS) guar gum cinnamate (GGCi); contacting the nanoparticles of a high degree of substitution guar gum cinnamate with contaminated water; and adsorbing pollutants from the contaminated water onto a surface of the nanoparticles of a high degree of substitution guar gum cinnamate, thereby decontaminating the water.

In further embodiments, the nanoparticles are hydrophobic, and the method of water decontamination by the high DS GGCi nanoparticles comprises removal of organic dyes, such as, by way of non-limiting example, Bisphenol A, Methylene Blue, and combinations thereof, as well as potentially other pollutants carried out by a simple adsorption process. Furthermore, the hydrophobic nanoparticles can result in microbial decontamination of the previously contaminated water. In certain embodiments, the water to be decontaminated is effluent water, for example, effluent water used in various chemical manufacturing processes.

In certain embodiments of carrying out the present water decontamination methods, the nanoparticles are dispersed in the contaminated water. In this regard, the dispersed nanoparticles can have a particle size of about 200 nm to about 300 nm, or of about 289 nm. In additional embodiments, the nanoparticles used in the present decontamination methods can be nearly spherical. In further embodiments, the nanoparticles used in the present decontamination methods can have a Polydispersity Index (PDI) of about 0.43 and a Zeta-potential of about 16.5 mV to about 21.5 mV.

As shown in Table 3, the present methods can provide the following amounts of adsorption of the pollutants Bisphenol A and Methylene Blue dye removed successfully from effluent water using the present GGCi nanoparticles.

TABLE 3

| Pollutants | Amount adsorbed | Isotherm |
|---|---|---|
| Bisphenol A | 610 µg/g | Freudlich |
| Methylene Blue | 75 mg/g | Langmuir |

In other embodiments, the present subject matter includes using the present GGCi nanoparticles for antibacterial purposes, including, by way of non-limiting example, against *E. coli* and *S. aureus*.

EXAMPLES

Example 1

Homogeneous Phase Synthesis of Guar Gum Cinnamate (GGCi)

Raw guar gum (GG) was washed by a facile solvent water washing technique before a derivatization reaction was conducted. Guar gum cinnamate (GGCi) was synthesized in Hofmeister ion guided homogeneous phase reactions. Briefly, 5 g of washed GG was soaked in 300 mL 50% (v/v) aqueous isopropanol for 24 h. The solution was decanted off and the GG residue was added to 80 mL DMSO under continuous stirring (200 rpm). 2 g of LiCl previously dissolved in 20 mL DMSO was added to the solution and stirred briefly to obtain a clear homogeneous solution. The contents were then transferred to a 250 mL three necked round bottomed flask equipped with a mechanical stirrer, nitrogen purging unit and a reflux condenser.

Figure 7:
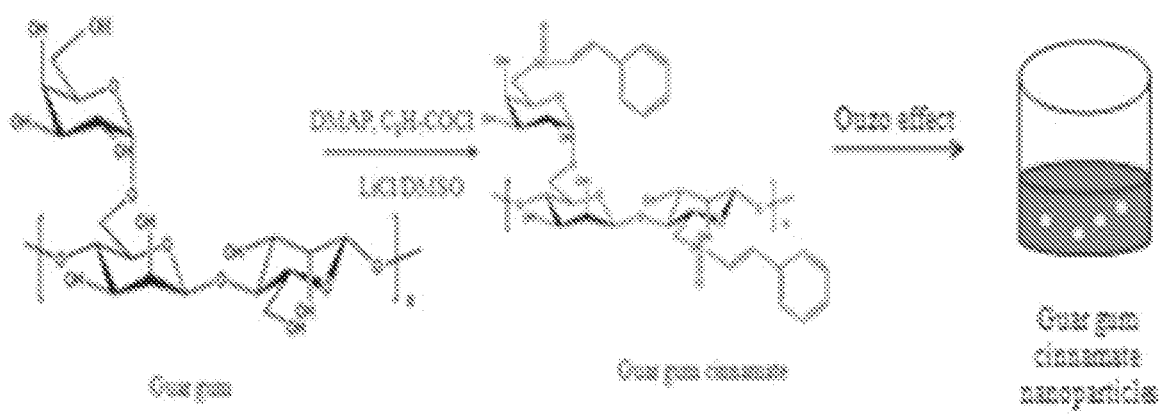
FIG. 7 shows a schematic representation of the synthesis of guar gum cinnamate and guar gum cinnamate nanoparticles.

The reaction setup was placed over an electrical heating mantle and the temperature was maintained at 30±2° C. throughout. DMAP (11.29 g) dissolved in 5 mL DMSO was added and stirred at 80 rpm for 30 min for equilibration. Cinnamoyl chloride (14 mL) was added dropwise under nitrogen purging (5 mL min-1). The reaction was carried for a further 3.5 h under stirring and nitrogen purging until completion. The solution was then poured into ice cold aqueous ethanol (300 mL, 50%) and kept overnight. The solution was filtered thereafter and the white fluffy precipitate of GGCi was collected and further washed with distilled water several times. Finally, GGCi was soxhlated against methanol and the leachants checked free from aromatic acids by UV spectrophotometer. GGCi was collected and preserved in screw cap airtight bottles in desiccators for further applications. This process is summarized as shown in FIG. 7.

Different molar ratios of cinnamoyl chloride to polymer were used to obtain high degree of substitution (DS) products. Hofmeister ion guided homogeneous phase synthesis of different high DS guar cinnamate was reported. Cinnamoyl chloride was used as the reagent and DMAP acted as an acid scavenger. The reaction was fast and exothermic and hence maintained at 30±2° C. In the DMSO solvent system, LiCl ion pairs acted as chaotropes and increased the disorder within the polymer network, thus facilitating substitution. Furthermore, the undissociated ion pairs of LiCl in polar solvents like DMSO, reacted with the hydroxyl group in GG to hinder the reformation of intra molecular H-bonds.

The obtained GGCi product had a degree of substitution (DS) of 1.4, as seen in Table 4, which was achieved when the ratio of anhydrohexose unit of GG to cinnamoyl chloride was 1:3.

TABLE 4

| Compound | Molar ratio of anhydro-sugar unit to cinnamoyl chloride | C, H, N analysis (wt %) Corrected | | | C, H, N analysis (wt %) Experimental | | | Degree of Substitution (DS) |
|---|---|---|---|---|---|---|---|---|
| | | C | H | N | C | H | N | |
| Guar gum (GG) | — | 44.44 | 6.17 | — | 39.90 | 6.20 | — | — |
| Guar gum cinnamate (GGCi) | 1:3 | 34.21 | 5.32 | — | 30.82 | 5.35 | — | 1.40 |

Unreacted acids and aromatics were removed by several washings with distilled water and finally by soxhlation against methanol. GGCi obtained was readily soluble in DMSO (10 mg/mL) but insoluble in water and ionic solvents.

Example 2

Guar Gum Cinnamate Nanoparticles Synthesis

GGCi nanoparticles were prepared by a facile nanoprecipitation technique. 10 mL of GGCi dissolved in DMSO (5 mg mL-1) was taken in a dialysis bag and placed in 1000 mL deionized water under constant magnetic stirring (200 rpm) for 30 h. The water was replaced with fresh water after every 3 h. After 30 h, the contents in the dialysis bag were transferred into a round bottomed flask and lyophilized to powders for analysis. Also, the bag contents were preserved in screw cap bottles and stored at 4° C.

Example 3

Characterization of Guar Gum Cinnamate and Nanoparticles

The degree of substitution (DS) of GGCi was routinely determined by elemental analysis. The analysis was carried out by the combustion technique in a CHN analyser. Solid state $^{13}C$-NMR of GG and GGCi was studied. Infra-red spectra of GG and GGCi were recorded in a FTIR spectrometer. The samples were pelletized with KBr (IR grade, Merck, India), and scanned over the wavelength range of 400-4000 cm-1 with background corrections of 64.

The particle size, polydispersity index (PDI) and zeta-potential (Q of guar gum cinnamate nanoparticles were recorded in DLS. The nanoparticles were dispersed in HPLC grade water and exposed to a 4 mW helium-neon laser beam at 633 nm, with a back scattering angle of 173°. Analysis was done in triplicate and data was averaged. Nanoparticles shape and morphology were analyzed in a scanning electron microscope. Samples were diluted with HPLC water, drop cast onto cover slips, dried for 24 h and sputter coated with platinum at 15 kV and analyzed in Smart SEM software.

Example 4

Antibacterial Results

Antibacterial studies were evaluated using standard *E. coli* (MTCC 44) and *S. aureus* (MTCC 160) strains. Ciprofloxacin was used as the negative control. The MIC for GGCi and guar gum cinnamate nanoparticles was 600 and 300 μg mL-1 respectively in *E. coli* and 1000 and 500 μg/mL respectively in *S. aureus* (see Table 5). Thus, the effect of nanoparticles in bacterial growth retardation was twice that of the native GGCi. This was due to the increase in specific surface area of the spherical nanoparticles which augmented cell contact and resulted in cell death. Bacterial contact killing was very much prominent for nanoparticles than GGCi as observed from the killing kinetics experiment.

Figure 3A:
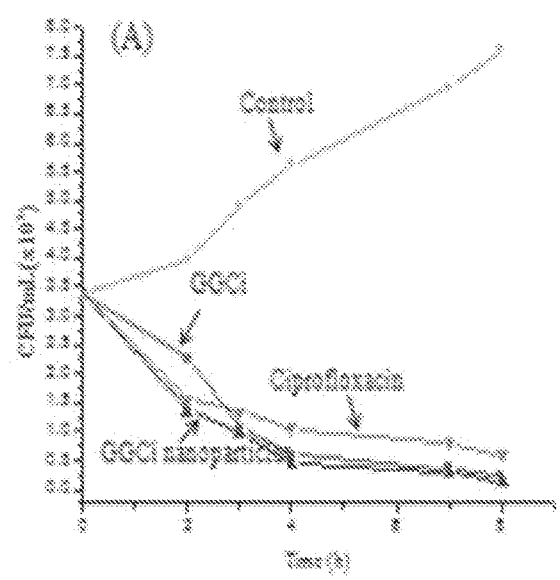
FIG. 3 provides charts showing time kill kinetics study against (A) *E. coli*; and (B) *S. aureus*.
Figure 3B:
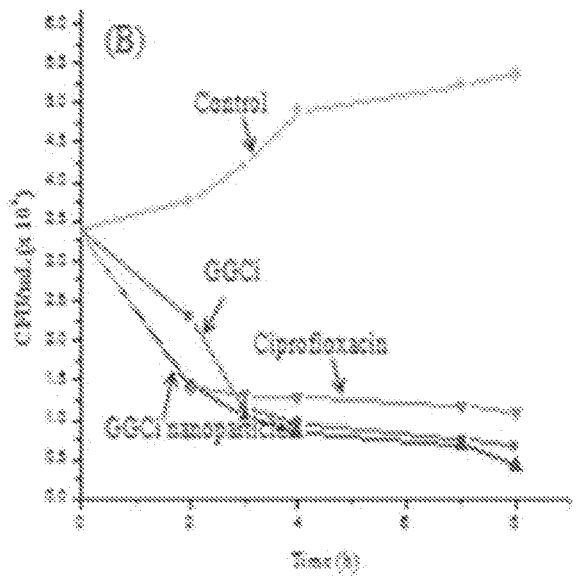
Figure 4:
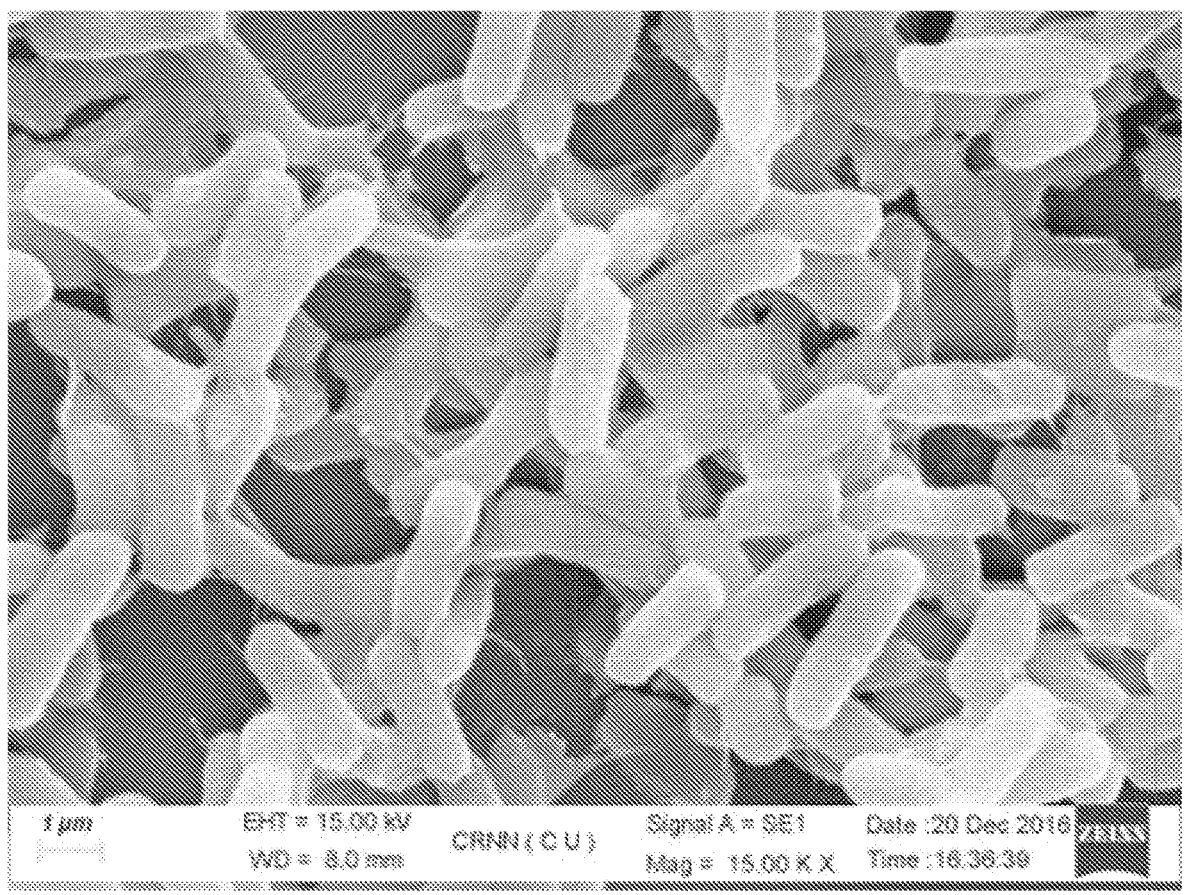
FIG. 4 shows an SEM image of *E. coli* (control).
Figure 5:
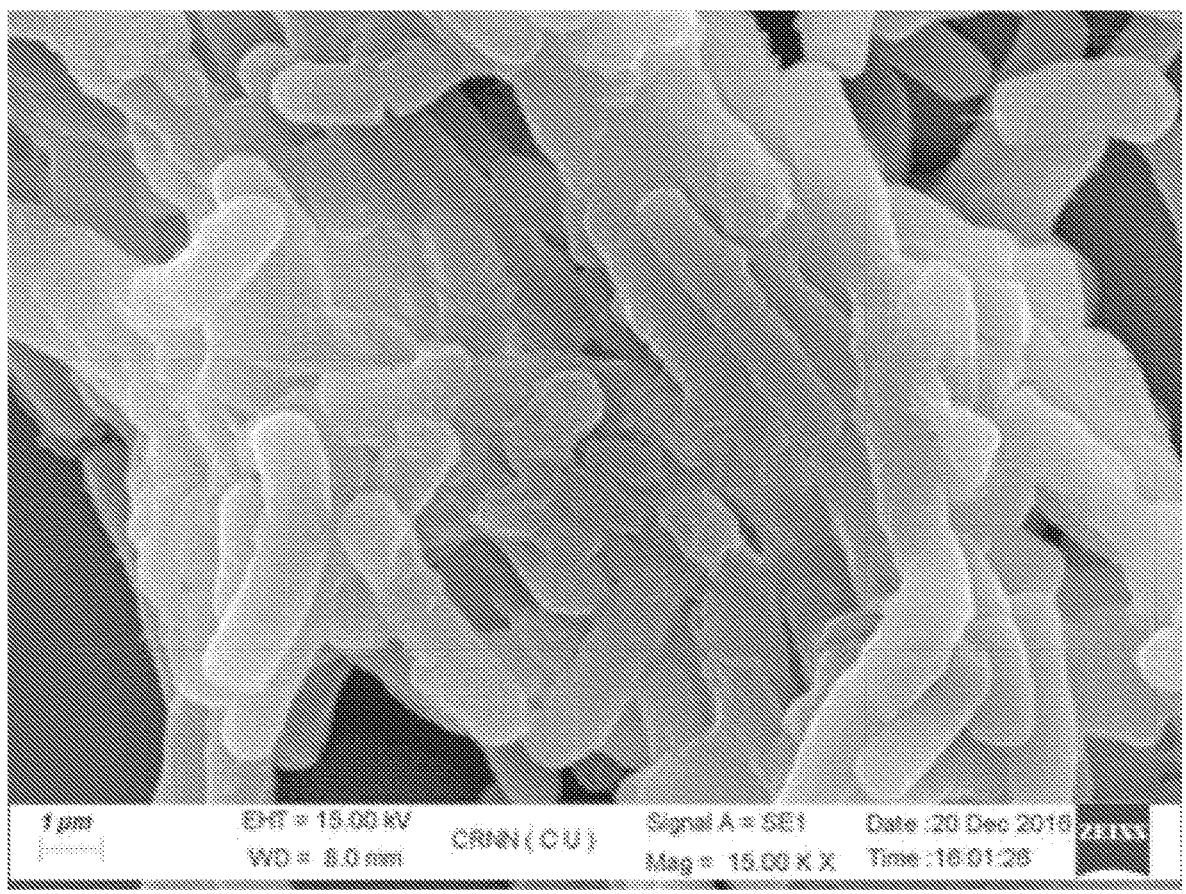
FIG. 5 shows an SEM image of *E. coli* after GGCi nanoparticle treatment.
Figure 6:
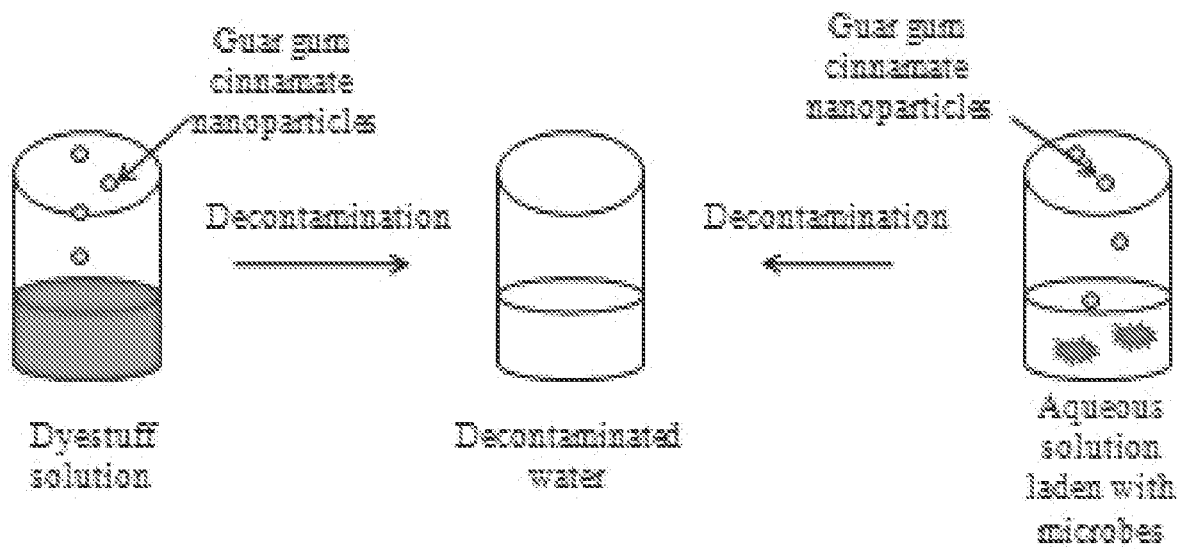
FIG. 6 shows a schematic representation of decontamination of water using the present GGCi nanoparticles.

Growth retardation was faster in the case of *E. coli* than for *S. aureus* (See FIGS. 3A and 3B). Quantitative killing was observed in each case after 4 h of contact time. Increased surface area and strong hydrophobic and aromatic interactions in nanoscale resulted in membrane perforations and cell death. SEM morphology of *E. coli* cells was studied (see FIG. 4) to understand the killing effects of nanoparticles. For *E. coli* cells treated with GGCi nanoparticles at MIC, membrane perforations were remarkable resulting in cell death (see FIG. 5). Thus, guar gum cinnamate nanoparticles were suitable for bacterial growth retardation and cell death.

TABLE 5

| Compound | Bacteria | MIC (μg/ml) |
|---|---|---|
| GGCi | *E. coli* | 600 |
| | *S. aureus* | 1000 |
| GGCi nanoparticles | *E. coli* | 300 |
| | *S. aureus* | 500 |

It is to be understood that the decontamination of water using guar gum guar gum cinnamate (GGCi) nanoparticles and the guar gum cinnamate (GGCi) and GGCi nanoparticles fabrication processes are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A method for decontaminating water, the method comprising:
providing nanoparticles of a high degree of substitution (DS) guar gum cinnamate (GGCi);

contacting the nanoparticles of a high degree of substitution guar gum cinnamate with water contaminated with one or more organic dyes; and adsorbing the one or more organic dyes from the water contaminated with one or more organic dyes onto a surface of the nanoparticles of a high degree of substitution guar gum cinnamate, thereby decontaminating the water.

2. The method as recited in claim 1, wherein the nanoparticles are hydrophobic.

3. The method as recited in claim 1, wherein the one or more organic dyes are selected from the group consisting of Bisphenol A, Methylene Blue, and combinations thereof.

4. The method as recited in claim 1, wherein the nanoparticles result in microbial decontamination of the water.

5. The method as recited in claim 1, wherein the contaminated water is effluent water.

6. The method as recited in claim 1, wherein the nanoparticles are dispersed in the contaminated water.

7. The method as recited in claim 1, wherein the nanoparticles have a particle size of about 200 nm to about 300 nm.

8. The method as recited in claim 7, wherein the nanoparticles have a particle size of about 289 nm.

9. The method as recited in claim 1, wherein the nanoparticles have a Polydispersity Index (PDI) of about 0.43.

10. The method as recited in claim 1, wherein the nanoparticles have a Zeta-potential of about 16.5 mV to about 21.5 mV.

\* \* \* \* \*